(12) United States Patent
Chiu et al.

(10) Patent No.: US 12,147,140 B2
(45) Date of Patent: Nov. 19, 2024

(54) ANTI-PEEPING DISPLAY DEVICE

(71) Applicant: AUO Corporation, Hsinchu (TW)

(72) Inventors: Min-Hsuan Chiu, Hsinchu (TW); Wei-Ming Cheng, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/505,132

(22) Filed: Nov. 9, 2023

(65) Prior Publication Data
US 2024/0248362 A1 Jul. 25, 2024

Related U.S. Application Data

(60) Provisional application No. 63/439,951, filed on Jan. 19, 2023.

(30) Foreign Application Priority Data

Mar. 31, 2023 (TW) ................................. 112112471

(51) Int. Cl.
*G02F 1/137* (2006.01)
*G02F 1/1335* (2006.01)
*G02F 1/1347* (2006.01)

(52) U.S. Cl.
CPC ........ *G02F 1/137* (2013.01); *G02F 1/133531* (2021.01); *G02F 1/1347* (2013.01)

(58) Field of Classification Search
CPC .............................. G02F 1/1323; G02F 1/1347
See application file for complete search history.

(56) References Cited

U.S. PATENT DOCUMENTS

| 10,823,990 B2 | 11/2020 | Acreman et al. |
| 2006/0103782 A1* | 5/2006 | Adachi ............. G02F 1/133632 349/96 |
| 2019/0353944 A1 | 11/2019 | Acreman et al. |
| 2023/0127094 A1* | 4/2023 | Chen .................... G02F 1/13362 349/96 |
| 2023/0296932 A1* | 9/2023 | Murata ................. G02F 1/1323 349/56 |
| 2023/0350239 A1* | 11/2023 | Li .......................... G02F 1/1337 |

FOREIGN PATENT DOCUMENTS

| CN | 110568641 | 2/2022 |
| CN | 110501823 | 7/2022 |
| CN | 115453781 | 12/2022 |
| TW | 202004277 | 1/2020 |

\* cited by examiner

*Primary Examiner* — Alexander P Gross
(74) *Attorney, Agent, or Firm* — JCIPRNET (57) ABSTRACT

An anti-peeping display device including a display panel and a viewing angle control module, which are stacked, is provided. The viewing angle control module includes a first polarization layer, a first liquid crystal layer, a second polarization layer, a second liquid crystal layer and a third polarization layer that are sequentially stacked. The phase retardations of the first liquid crystal layer and the second liquid crystal layer are within 700 nm to 1200 nm.

18 Claims, 5 Drawing Sheets

ANTI-PEEPING DISPLAY DEVICE

CROSS-REFERENCE TO RELATED APPLICATION

This application claims the priority benefit of U.S. provisional application Ser. No. 63/439,951, filed on Jan. 19, 2023 and Taiwan application serial no. 112112471, filed on Mar. 31, 2023. The entirety of each of the above-mentioned patent applications are hereby incorporated by reference herein and made a part of this specification.

BACKGROUND

Technical Field

The disclosure relates to a display device, and in particular relates to an anti-peeping display device.

Description of Related Art

Generally speaking, in order for multiple viewers to watch together, a display device usually has a display effect with a wide viewing angle. However, in some cases or occasions, it is necessary to restrict the viewing direction. For example, in recent years, the demand for anti-peeping screens in vehicles has gradually increased. The main reason is to shield the viewing angle of the driver (i.e., anti-peeping against the driver) while the passengers enjoy the audio-visual facilities, so as to avoid affecting driving safety. In other words, an asymmetric viewing angle is required. In addition, it is desirable that both the driver and the passenger may view the screen simultaneously when there are no concerns about driving safety. However, the existing anti-peep switching technologies on the market are all with symmetrical viewing angles, and cannot limit the brightness of certain specific viewing angles.

SUMMARY

An anti-peeping display device with good anti-peeping capability is provided.

According to an embodiment of the disclosure, an anti-peeping display device is provided, including a display panel and a viewing angle control module. The viewing angle control module includes a first polarization layer, a first liquid crystal layer, a second polarization layer, a second liquid crystal layer, and a third polarization layer that are sequentially stacked. Phase retardations of the first liquid crystal layer and the second liquid crystal layer are within 700 nm to 1200 nm. The viewing angle control module has a first side close to the first polarization layer and a second side close to the third polarization layer, and the display panel is disposed on the first side of the viewing angle control module or on the second side of the viewing angle control module.

Based on the above, the anti-peeping display device provided by the embodiment of the disclosure utilizes a double TN liquid crystal structure to provide good anti-peeping capability. Moreover, the phase retardation of the double TN liquid crystal layer is within 700 nm to 1200 nm, so that the brightness and chromaticity of the front viewing angle do not show a large difference between the anti-peeping mode and the sharing mode.

In order to make the above-mentioned features and advantages of the disclosure comprehensible, embodiments accompanied with drawings are described in detail below.

DETAILED DESCRIPTION OF DISCLOSED EMBODIMENTS

Figure 1:
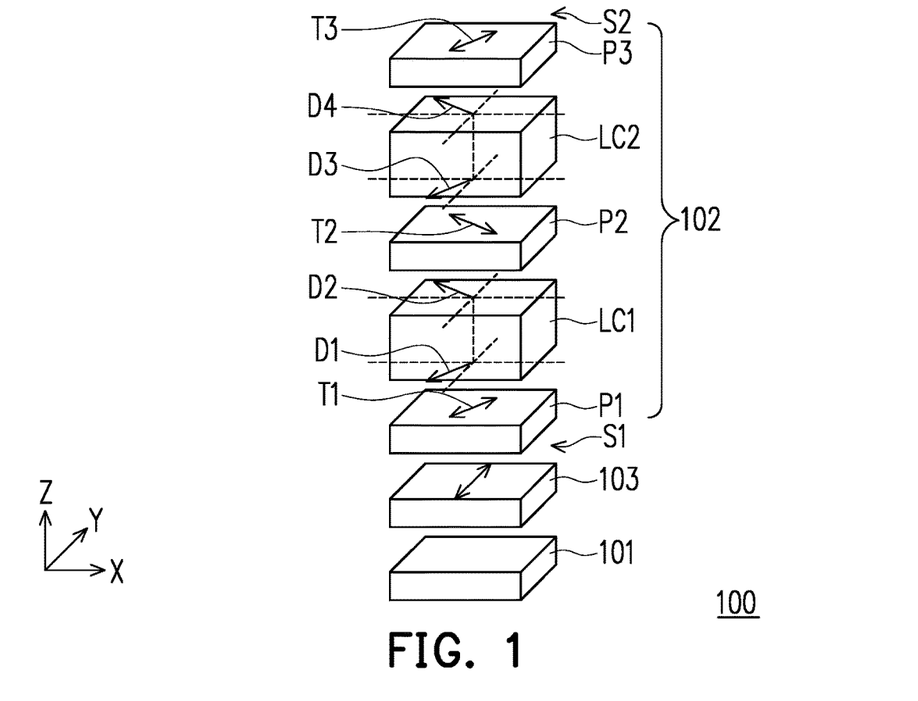
FIG. 1 is a schematic diagram of an anti-peeping display device according to an embodiment of the disclosure.

Referring to FIG. 1, which illustrates an anti-peeping display device according to an embodiment of the disclosure. The anti-peeping display device 100 includes a display panel 101, a viewing angle control module 102 and a quarter-wave plate 103. The viewing angle control module 102 includes a first polarization layer P1, a first liquid crystal layer LC1, a second polarization layer P2, a second liquid crystal layer LC2, and a third polarization layer P3 that are sequentially stacked. The liquid crystal molecules in the first liquid crystal layer LC1 and the second liquid crystal layer LC2 are twisted nematic liquid crystals (TN liquid crystals).

It should be noted that the anti-peeping display device 100 is placed on the X-Y plane, the +X direction has an azimuth angle of 0 degrees, the +Y direction has an azimuth angle of 90 degrees, the −X direction has an azimuth angle of 180 degrees, and the −Y direction has an azimuth angle of 270 degrees. The +Z direction has a viewing angle of 0 degrees, that is, a positive viewing angle direction.

It should be noted that each embodiment of the disclosure utilizes the asymmetry of the gray-scale viewing angle when the TN liquid crystal in the viewing angle control module is driven to achieve a display mode with an asymmetrical viewing angle (hereinafter referred to as the anti-peeping mode). Moreover, when the TN liquid crystal is not driven, the display mode returns to a sharing mode with symmetrical viewing angles.

Figure 3:
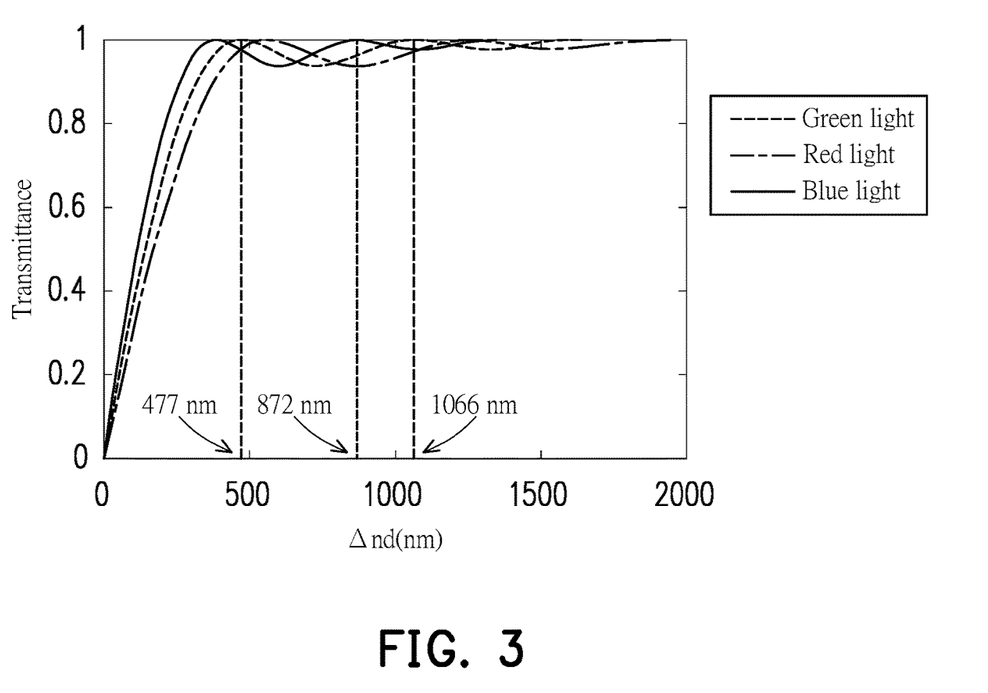
FIG. 3 is a relationship graph between phase retardation and light transmittance of the liquid crystal layer.

In some embodiments of the disclosure, the phase retardations of the first liquid crystal layer LC1 and the second liquid crystal layer LC2 are both within 700 nm to 1200 nm, so as to maintain the brightness of the front viewing angle and avoid excessive brightness attenuation when switching to anti-peeping mode. Specifically, please refer to FIG. 3 and Table 1 to understand the influence of the phase retardation of the TN liquid crystal layer of the viewing angle control module 102 on the brightness and chromaticity of transmitted light. FIG. 3 is a relationship graph between the phase retardation of the liquid crystal layer and the transmittance of different colors of light. In the comparative example shown in Table 1, the phase retardation of the TN liquid crystal layer is 477 nm, which corresponds to the maximum first order transmittance of the green light band of 550 nm. In the first embodiment of the disclosure shown in Table 1, the phase retardation of the TN liquid crystal layer is 872 nm, which corresponds to the maximum second order transmittance of the blue light band of 450 nm. In the second embodiment of the disclosure shown in Table 1, the phase retardation of the TN liquid crystal layer is 1066 nm, which corresponds to the maximum second order transmittance of the green light band of 550 nm. Table 1 lists the front viewing angle values (x value, y value) and brightness value (Y value) in the sharing mode and the anti-peeping mode in the above comparative example and the first and second embodiments of the disclosure.

TABLE 1

|  | Comparative example | | | First embodiment | | | Second embodiment | | |
| --- | --- | --- | --- | --- | --- | --- | --- | --- | --- |
|  | x | y | Y | x | y | Y | x | y | Y |
| Sharing mode | 0.313 | 0.308 | 241.2 | 0.289 | 0.277 | 217.2 | 0.303 | 0.288 | 241.0 |
| Anti-peeping mode | 0.249 | 0.222 | 127.3 | 0.282 | 0.267 | 204.6 | 0.285 | 0.270 | 200.4 |
| Δ(x, y) | 0.064 | 0.086 | | 0.007 | 0.010 | | 0.018 | 0.018 | |

As shown in Table 1, the front viewing angle brightness of the display device of the comparison example in the anti-peeping mode is 127.3 nits, which is significantly lower than the front viewing angle brightness of 241.2 nits in the sharing mode. In contrast, the front viewing angle brightness of the first embodiment of the disclosure in the anti-peeping mode is 204.6 nits, which is only slightly lower than the front viewing angle brightness of 217.2 nits in the sharing mode. The front viewing angle brightness of the second embodiment of the disclosure in the anti-peeping mode is 200.4 nits, which is only slightly lower than the front viewing angle brightness of 241.0 nits in the sharing mode.

In addition, as shown in Table 1, the chromaticity difference between the front viewing angle of the comparative example in the sharing mode and the anti-peeping mode is Δ(x, y)=(0.064, 0.086). In contrast, the chromaticity difference between the first embodiment of the disclosure in the sharing mode and the anti-peeping mode is Δ(x, y)=(0.007, 0.010), and the chromaticity difference between the second embodiment of the disclosure in the sharing mode and the anti-peeping mode is is Δ(x,y)=(0.018, 0.018). That is, compared with the comparative example, in the first embodiment and the second embodiment of the disclosure, the chromaticity difference between the sharing mode and the anti-peeping mode of the front viewing angle is small, and the display device has better chromaticity performance.

Therefore, according to some embodiments of the disclosure, the phase retardations of the first liquid crystal layer LC1 and the second liquid crystal layer LC2 are both configured within 872 nm±100 nm. According to some embodiments of the disclosure, the phase retardations of the first liquid crystal layer LC1 and the second liquid crystal layer LC2 are configured within 1066 nm±100 nm, so that the brightness and chromaticity performance of the front viewing angle are good, and the TN liquid crystal layer with the above-mentioned phase retardation also meets the requirement that the brightness at a side viewing angle of 45 degrees is less than 1% of the brightness at a front viewing angle.

Referring to FIG. 1 again, the viewing angle control module 102 has a first side S1 close to the first polarization layer P1 and a second side S2 close to the third polarization layer P3. In this embodiment, the display panel 101 is disposed on the first side S1 of the viewing angle control module 102, that is, the display panel 101 is disposed below the viewing angle control module 102, and the quarter-wave plate 103 is sandwiched between the display panel 101 and the viewing angle control module 102.

The first polarization layer P1 has a first transmission direction T1, the first liquid crystal layer LC1 has a first alignment direction D1 and a second alignment direction D2, the second polarization layer P2 has a second transmission direction T2, the second liquid crystal layer LC2 has a third alignment direction D3 and a fourth alignment direction D4, and the third polarization layer P3 has a third transmission direction T3. In this embodiment, the second transmission direction T2 is perpendicular to the first transmission direction T1 and the third transmission direction T3. The directional limitations of the first alignment direction D1, the second alignment direction D2, the third alignment direction D3 and the fourth alignment direction D4 may be achieved by disposing multiple alignment layers (not shown). The liquid crystal molecules in the first liquid crystal layer LC1 may achieve a good rotation effect by the first alignment direction D1 and the second alignment direction D2. Likewise, the liquid crystal molecules in the second liquid crystal layer LC2 may achieve a good rotation effect through the third alignment direction D3 and the fourth alignment direction D4.

In the embodiment shown in FIG. 1, the display panel 101 is a self-luminous display panel, such as an organic light-emitting diode display panel or a micro light-emitting diode display panel. The quarter-wave plate 103 is disposed between the self-luminous display panel 101 and the viewing angle control module 102, in which the slow axis of the quarter-wave plate 103 is parallel to the Y direction (i.e., it has an azimuth angle of 90 degrees), and is angled at 45 degrees relative to the first transmission direction T1. Accordingly, when the ambient light passes through the viewing angle control module 102, the linearly polarized light passing downward through the first polarization layer P1 is formed into left-handed light/right-handed light after passing through the quarter-wave plate 103, the left-handed light/right-handed light is formed as right-handed light/left-handed light after being reflected by the metal structure in the self-luminous display panel 101. After passing upwards through the quarter-wave plate 103, it is formed into linearly polarized light perpendicular to the first transmission direction T1, thus it is shielded by the first polarization layer P1. That is to say, by disposing the quarter-wave plate 103 sandwiched between the self-luminous display panel 101 and the viewing angle control module 102, the reflection of ambient light may be effectively avoided.

In this embodiment, the liquid crystal molecules in the first liquid crystal layer LC1 and the second liquid crystal layer LC2 are TN liquid crystals, and the anti-peeping display device 100 utilizes the asymmetry of the gray-scale viewing angle when the TN liquid crystal is driven to achieve an anti-peeping mode with an asymmetrical viewing angle. When the TN liquid crystal is not driven, the display mode of the anti-peeping display device 100 returns to the sharing mode with symmetrical viewing angles.

Furthermore, since the emitted light of the self-luminous display panel 101 has no obvious polarization state, compared with the situation that the upper polarizer of the liquid crystal display panel limits the viewing angle direction, the first transmission direction T1 in this embodiment is configured to have an azimuth angle of 45 degrees. Accordingly, the anti-peeping efficiency of the left viewing angle (i.e., azimuth angle of 180 degrees) may be greatly improved. However, the disclosure is not limited to the left and right anti-peeping described above. Specifically, since the emitted light of the self-luminous display panel 101 has no obvious polarization state, the anti-peeping viewing angle is not limited to the above left and right viewing angles, but the direction of the first transmission direction T1 may be changed according to requirements, so that it has any azimuth angle, and the anti-peeping viewing angle may be changed freely.

In the embodiment shown in FIG. 1, the first alignment direction D1 of the first liquid crystal layer LC1 is parallel to the third alignment direction D3 of the second liquid crystal layer LC2, and the second alignment direction D2 of the first liquid crystal layer LC1 is parallel to the fourth alignment direction D4 of the second liquid crystal layer LC2. The second transmission direction T2 is parallel to the second alignment direction D2 of the first liquid crystal layer LC1 and perpendicular to the third alignment direction D3 of the second liquid crystal layer LC2. The first polarization layer P1 and the second polarization layer P2 are attached to the first liquid crystal layer LC1 in E-mode, and the second polarization layer P2 and the third polarization layer P3 are attached to the second liquid crystal layer LC2 in O-mode.

In order to fully illustrate the various embodiments of the disclosure, other embodiments of the disclosure are described below. It is to be noted that the following embodiments use the reference numerals and a part of the contents of the above embodiments, and the same reference numerals are used to denote the same or similar elements, and the description of the same technical contents is omitted. For the description of the omitted part, reference may be made to the above embodiments, and details are not described in the following embodiments.

Figure 2:
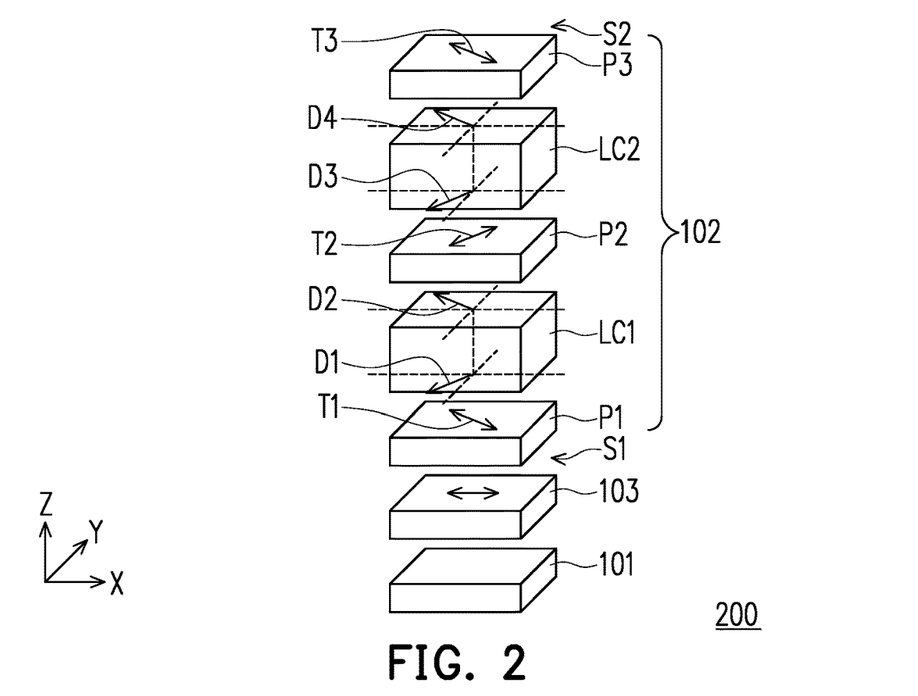
FIG. 2 is a schematic diagram of an anti-peeping display device according to an embodiment of the disclosure.

Next, please refer to FIG. 2, which illustrates an anti-peeping display device according to an embodiment of the disclosure. The anti-peeping display device 200 includes a display panel 101, a viewing angle control module 102 and a quarter-wave plate 103. The viewing angle control module 102 includes a first polarization layer P1, a first liquid crystal layer LC1, a second polarization layer P2, a second liquid crystal layer LC2 and a third polarization layer P3 that are sequentially stacked. The display panel 101 is disposed on the first side S1 of the viewing angle control module 102, but the disclosure is not limited thereto. In some embodiments, the display panel 101 is disposed on the second side S2 of the viewing angle control module 102.

The anti-peeping display device 200 of this embodiment is different from the anti-peeping display device 100 in that the slow axis of the quarter-wave plate 103 is parallel to the X direction (with an azimuth angle of 0 degrees), and the first transmission direction T1 is configured with an azimuth angle of 135 degrees. Therefore, the angle between the quarter-wave plate 103 and the first transmission direction T1 is 135 degrees. Accordingly, when the ambient light passes through the viewing angle control module 102 of the anti-peeping display device 200, the linearly polarized light passing downward through the first polarization layer P1 is formed into left-handed light/right-handed light after passing through the quarter-wave plate 103, the left-handed light/right-handed light is formed as right-handed light/left-handed light after being reflected by the metal structure in the self-luminous display panel 101. After passing upwards through the quarter-wave plate 103, it is formed into linearly polarized light perpendicular to the first transmission direction T1, thus it is shielded by the first polarization layer P1 to avoid ambient light reflection.

Since the first transmission direction T1 has an azimuth angle of 135 degrees, accordingly, the anti-peeping efficiency of the left viewing angle (i.e., an azimuth angle of 180 degrees) may be greatly improved. The anti-peeping viewing angle of the anti-peeping display device 200 is not limited to the above-mentioned left and right anti-peeping. Specifically, since the emitted light of the self-luminous display panel 101 has no obvious polarization state, the anti-peeping viewing angle is not limited to the above left and right viewing angles, but the direction of the first transmission direction T1 may be changed according to requirements, so that it has any azimuth angle, and the anti-peeping viewing angle may be changed freely.

The second transmission direction T2 is perpendicular to the second alignment direction D2 of the first liquid crystal layer LC1 and parallel to the third alignment direction D3 of the second liquid crystal layer LC2. The second transmission direction T2 is perpendicular to the first transmission direction T1 and the third transmission direction T3. The first polarization layer P1 and the second polarization layer P2 are attached to the first liquid crystal layer LC1 in O-mode, and the second polarization layer P2 and the third polarization layer P3 are attached to the second liquid crystal layer LC2 in E-mode.

Figure 4A:
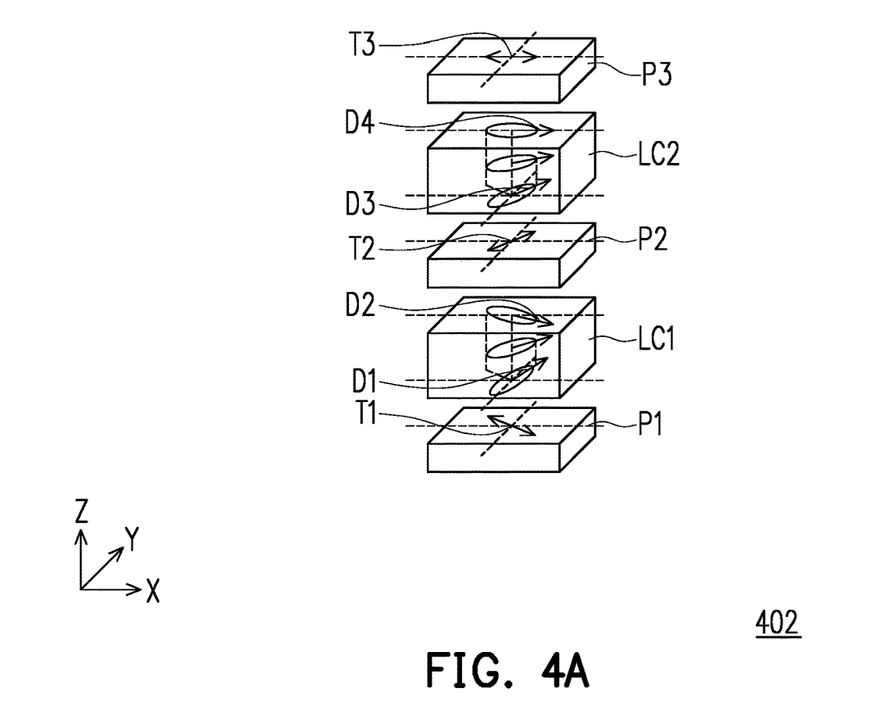
FIG. 4A is a schematic diagram of a viewing angle control module according to an embodiment of the disclosure.
Figure 4B:
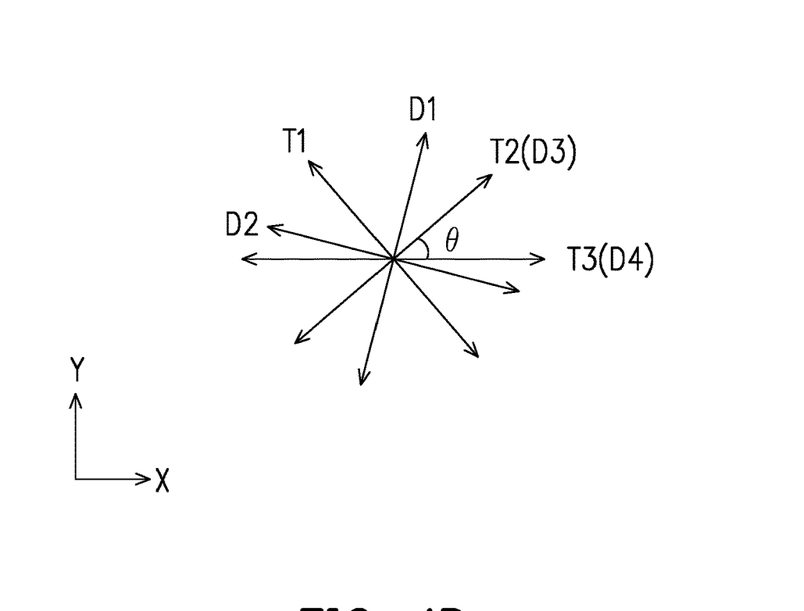
FIG. 4B is a schematic diagram of the axes shown in the viewing angle control module in FIG. 4A.

Refer to FIG. 4A and FIG. 4B. FIG. 4A is a schematic diagram of a viewing angle control module according to an embodiment of the disclosure, and FIG. 4B is a schematic diagram of the axes shown in the viewing angle control module in FIG. 4A. The viewing angle control module 402 includes a first polarization layer P1, a first liquid crystal layer LC1, a second polarization layer P2, a second liquid crystal layer LC2, and a third polarization layer P3 that are sequentially stacked. The liquid crystal molecules in the first liquid crystal layer LC1 and the second liquid crystal layer LC2 are twisted nematic liquid crystals (TN liquid crystals). The third alignment direction D3 of the second liquid crystal layer LC2 is parallel to the second transmission direction T2, the fourth alignment direction D4 of the second liquid crystal layer LC2 is parallel to the third transmission direction T3, and the second alignment direction D2 of the first liquid crystal layer LC1 is not parallel to the second transmission direction T2.

The viewing angle control module 402 in FIG. 4A is the same as the viewing angle control module 102 in FIG. 1 and FIG. 2 in that the included angle between the first alignment direction D1 of the first liquid crystal layer LC1 and the second alignment direction D2 of the first liquid crystal layer LC1 is 90 degrees, and the first transmission direction T1 is perpendicular to the second transmission direction T2. The viewing angle control module 402 in FIG. 4A is different from the viewing angle control module 102 in FIG. 1 and FIG. 2 in that the included angle between the third alignment direction D3 of the second liquid crystal layer LC2 and the fourth alignment direction D4 of the second liquid crystal layer LC2 is an included angle θ, and the included angle θ is greater than or equal to 45 degrees and less than 90 degrees. In some preferred embodiments, the included angle θ is within 45 degrees to 65 degrees.

Referring to Table 2:

|  | Comparative example | Third embodiment | Fourth embodiment | Fifth embodiment | Sixth embodiment |
|---|---|---|---|---|---|
| Overall anti-peeping capability | worse | passable | best | better | better |
| Color shift | worse | passable | better | best | better |
| Large-angle anti-peeping performance | better | better | better | better | best |

In the comparative example in Table 2, the anti-peeping performance of the structure having a single liquid crystal layer and two polarization layers sandwiching the single liquid crystal layer was tested. In the third embodiment to the sixth embodiment of the disclosure, the anti-peeping performance of the structure of the viewing angle control module 402 as shown in FIG. 4A was tested, where the included angle θ is respectively 90 degrees, 65 degrees, 60 degrees, and 45 degrees. According to Table 2, it may be seen that when the included angle θ is 65 degrees, the overall anti-peeping capability is the best. When the included angle θ is 60 degrees, the color shift of the anti-peeping mode relative to the sharing mode is the smallest. When the included angle θ is 60 degrees, the large-angle anti-peeping performance is the best.

Figure 5:
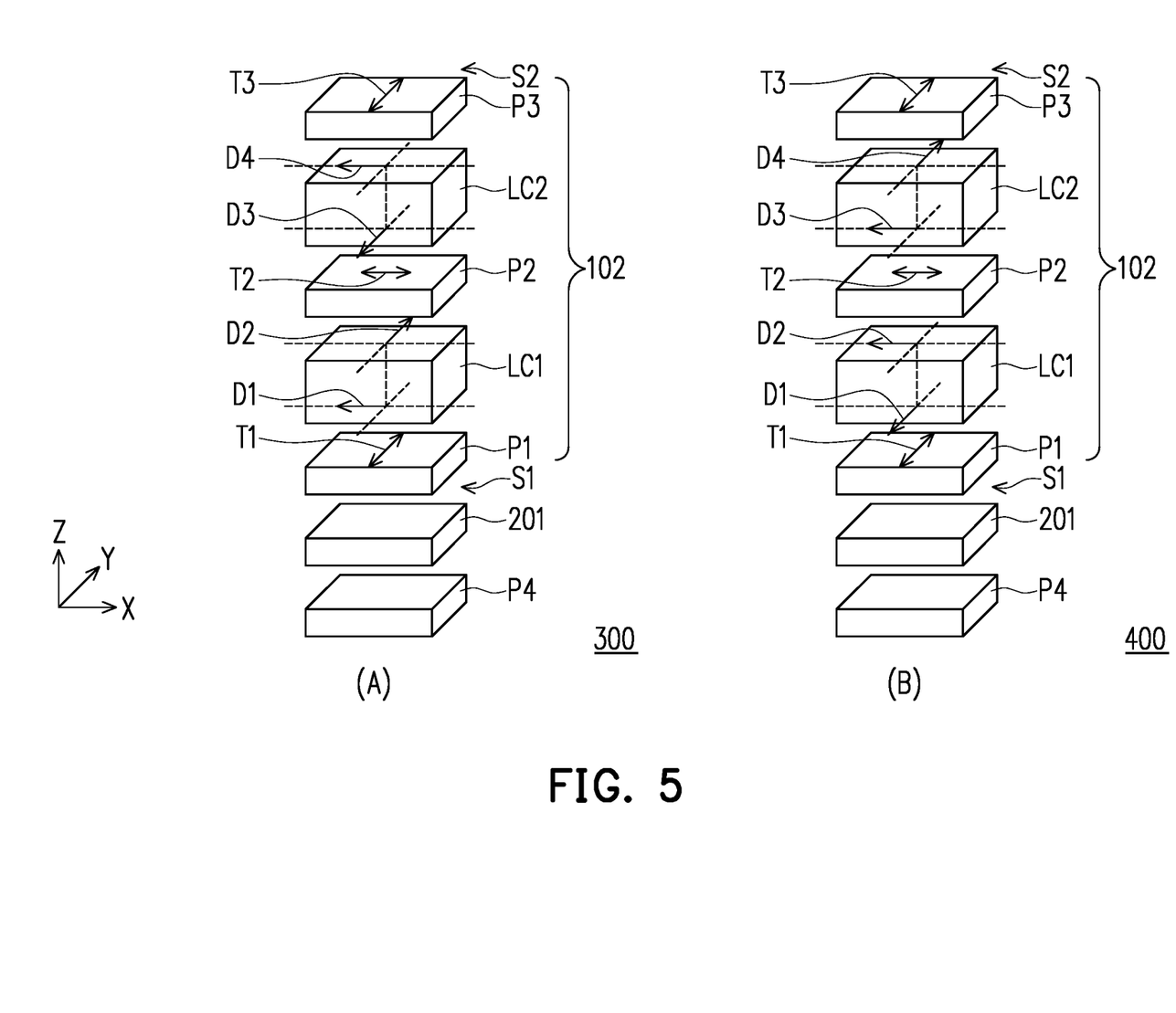
FIG. 5 is a schematic diagram of an anti-peeping display device according to an embodiment of the disclosure.
Figure 6:
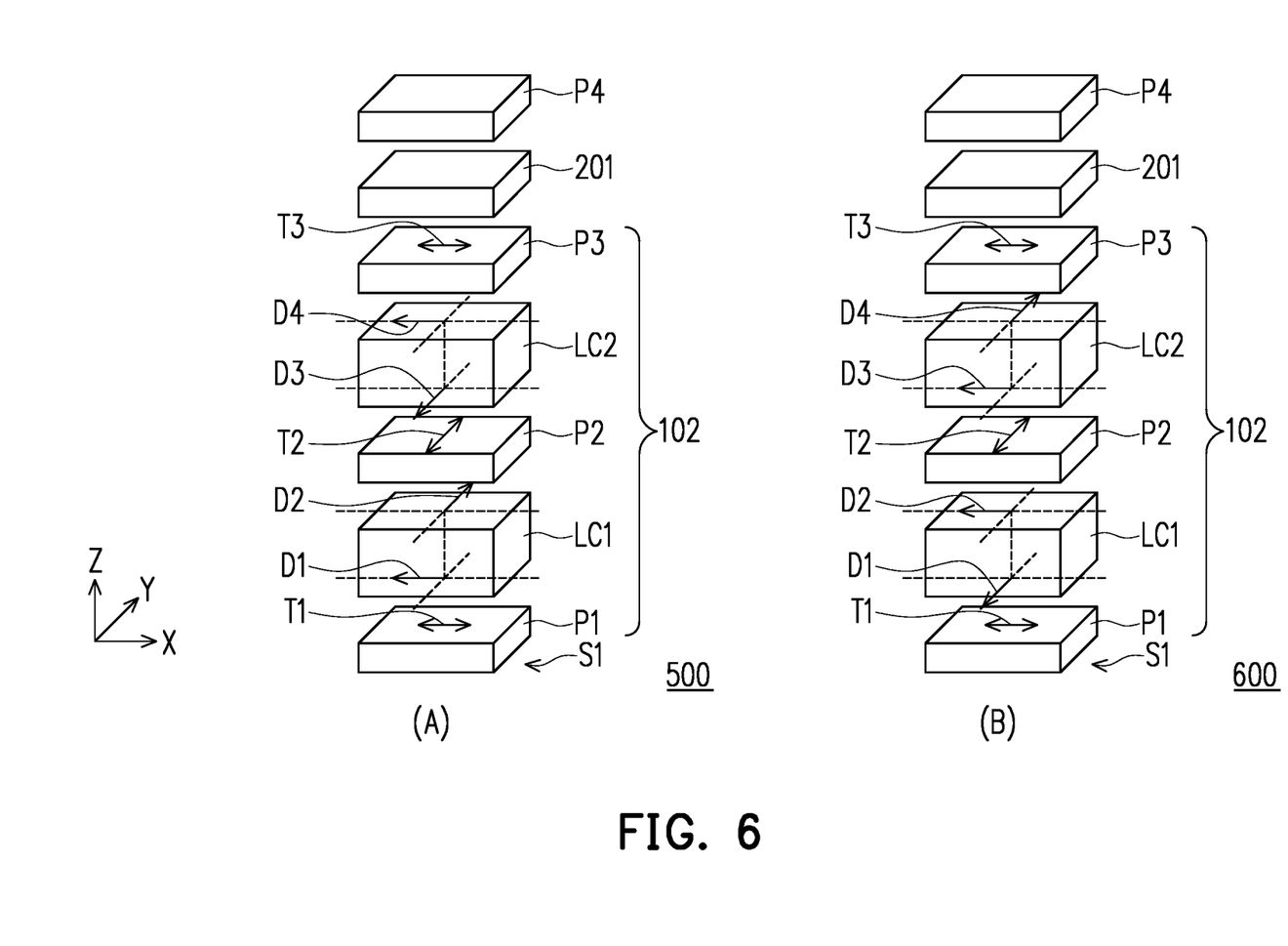
FIG. 6 is a schematic diagram of an anti-peeping display device according to an embodiment of the disclosure.

Referring to FIG. 5 and FIG. 6, part (A) of FIG. 5 shows a schematic diagram of an anti-peeping display device 300 according to an embodiment of the disclosure, part (B) of FIG. 5 shows a schematic diagram of an anti-peeping display device 400 according to an embodiment of the disclosure, part (A) of FIG. 6 shows a schematic diagram of an anti-peeping display display device 500 according to an embodiment of the disclosure, and part (B) of FIG. 6 shows a schematic diagram of an anti-peeping display device 600 according to an embodiment of the disclosure.

The anti-peeping display devices 300 and 400 include a display panel 201, a viewing angle control module 102, and a fourth polarization layer P4. The display panel 201 is a liquid crystal display panel and is disposed on the first side S1 of the viewing angle control module 102, that is, the display panel 201 is disposed below the viewing angle control module 102.

For the anti-peeping display devices 300 and 400, the second transmission direction T2 is perpendicular to the first transmission direction T1 and the third transmission direction T3, the first alignment direction D1 of the first liquid crystal layer LC1 is perpendicular to the third alignment direction D3 of the second liquid crystal layer LC2, the second alignment direction D2 of the first liquid crystal layer LC1 is perpendicular to the fourth alignment direction D4 of the second liquid crystal layer LC2, and the third alignment direction D3 of the second liquid crystal layer LC2 is perpendicular to the fourth alignment direction D4 of the second liquid crystal layer LC2.

In the anti-peeping display device 300, the first polarization layer P1 and the second polarization layer P2 are attached to the first liquid crystal layer LC1 in O-mode, and the second polarization layer P2 and the third polarization layer P3 are attached to the second liquid crystal layer LC2 in O-mode.

In the anti-peeping display device 400, the first polarization layer P1 and the second polarization layer P2 are attached to the first liquid crystal layer LC1 in E-mode, and the second polarization layer P2 and the third polarization layer P3 are attached to the second liquid crystal layer LC2 in E-mode.

The anti-peeping display devices 500 and 600 include a display panel 201, a viewing angle control module 102, and a fourth polarization layer P4. The display panel 201 is a liquid crystal display panel and is disposed on the second side S2 of the viewing angle control module 102, that is, the display panel 201 is disposed above the viewing angle control module 102.

For the anti-peeping display devices 500 and 600, the second transmission direction T2 is perpendicular to the first transmission direction T1 and the third transmission direction T3, the first alignment direction D1 of the first liquid crystal layer LC1 is perpendicular to the third alignment direction D3 of the second liquid crystal layer LC2, the second alignment direction D2 of the first liquid crystal layer LC1 is perpendicular to the fourth alignment direction D4 of the second liquid crystal layer LC2, and the third alignment direction D3 of the second liquid crystal layer LC2 is perpendicular to the fourth alignment direction D4 of the second liquid crystal layer LC2.

In the anti-peeping display device 500, the first polarization layer P1 and the second polarization layer P2 are attached to the first liquid crystal layer LC1 in E-mode, and the second polarization layer P2 and the third polarization layer P3 are attached to the second liquid crystal layer LC2 in E-mode.

In the anti-peeping display device 600, the first polarization layer P1 and the second polarization layer P2 are attached to the first liquid crystal layer LC1 in O-mode, and the second polarization layer P2 and the third polarization layer P3 are attached to the second liquid crystal layer LC2 in O-mode.

Referring to Table 3, it describes the brightness ratio at oblique viewing angles to front viewing angles when the anti-peeping display devices 300, 400, 500, and 600 are used for right side anti-peeping (i.e., anti-peeping at an azimuth angle of 180 degrees).

TABLE 3

| Degree | Anti-peeping display device 300 | Anti-peeping display device 400 | Anti-peeping display device 500 | Anti-peeping display device 600 |
|---|---|---|---|---|
| 0 | 100.00% | 100.00% | 100.00% | 100.00% |
| 5 | 84.54% | 84.13% | 84.38% | 84.27% |
| 10 | 65.34% | 64.80% | 65.46% | 65.24% |
| 15 | 45.97% | 45.45% | 46.45% | 46.13% |
| 20 | 29.10% | 28.69% | 29.83% | 29.45% |
| 25 | 16.30% | 15.99% | 17.08% | 16.66% |
| 30 | 8.09% | 7.86% | 8.76% | 8.33% |
| 35 | 3.60% | 3.45% | 4.12% | 3.71% |
| 40 | 1.52% | 1.45% | 1.88% | 1.56% |
| 45 | 0.70% | 0.67% | 0.91% | 0.70% |
| 50 | 0.42% | 0.41% | 0.50% | 0.43% |
| 55 | 0.35% | 0.34% | 0.39% | 0.40% |
| 60 | 0.35% | 0.34% | 0.42% | 0.45% |
| 65 | 0.32% | 0.32% | 0.48% | 0.49% |
| 70 | 0.26% | 0.26% | 0.46% | 0.46% |
| 75 | 0.16% | 0.16% | 0.35% | 0.34% |
| 80 | 0.07% | 0.07% | 0.19% | 0.18% |

As shown in Table 3, the anti-peeping display device 400 has better optical performance than the anti-peeping display device 300, and its relative brightness is smaller when the side viewing angle is 45 degrees. The anti-peeping display device 600 has better anti-peeping performance than the anti-peeping display device 500, and its relative brightness is smaller when the side viewing angle is 45 degrees.

To sum up, the anti-peeping display device provided by the embodiment of the disclosure utilizes a double TN liquid crystal structure to provide good anti-peeping capability. Moreover, the phase retardation of the double TN liquid crystal layer is within 700 nm to 1200 nm, so that the brightness and chromaticity of the front viewing angle do not show a large difference between the anti-peeping mode and the sharing mode.

What is claimed is:

1. An anti-peeping display device, comprising:
   a display panel; and
   a viewing angle control module, comprising a first polarization layer, a first liquid crystal layer, a second polarization layer, a second liquid crystal layer, and a third polarization layer that are sequentially stacked, wherein phase retardations of the first liquid crystal layer and the second liquid crystal layer are within 700 nm to 1200 nm,
   wherein the viewing angle control module has a first side close to the first polarization layer and a second side close to the third polarization layer, and the display panel is disposed on the first side of the viewing angle control module or on the second side of the viewing angle control module,
   wherein the first polarization layer has a first transmission direction, the first liquid crystal layer has a first alignment direction and a second alignment direction, the second polarization layer has a second transmission direction, the second liquid crystal layer has a third alignment direction and a fourth alignment direction, the third polarization layer has a third transmission direction, and the second transmission direction is not parallel to the first transmission direction and the third transmission direction.

2. The anti-peeping display device according to claim 1, wherein the phase retardations of the first liquid crystal layer and the second liquid crystal layer are within 872 nm±100 nm.

3. The anti-peeping display device according to claim 1, wherein the phase retardations of the first liquid crystal layer and the second liquid crystal layer are within 1066 nm±100 nm.

4. The anti-peeping display device according to claim 1, wherein an included angle between the third alignment direction of the second liquid crystal layer and the fourth alignment direction of the second liquid crystal layer is within 45 degrees to 90 degrees.

5. The anti-peeping display device according to claim 4, wherein the included angle is within 45 degrees to 65 degrees.

6. The anti-peeping display device according to claim 4, wherein the third alignment direction of the second liquid crystal layer is parallel to the second transmission direction, and the fourth alignment direction of the second liquid crystal layer is parallel to the third transmission direction.

7. The anti-peeping display device according to claim 4, wherein an included angle between the first alignment direction of the first liquid crystal layer and the second alignment direction of the first liquid crystal layer is 90 degrees.

8. The anti-peeping display device according to claim 4, wherein the second alignment direction of the first liquid crystal layer is not parallel to the second transmission direction.

9. The anti-peeping display device according to claim 4, wherein the first transmission direction is perpendicular to the second transmission direction.

10. The anti-peeping display device according to claim 1, wherein the second transmission direction is perpendicular to the first transmission direction and the third transmission direction.

11. The anti-peeping display device according to claim 1, further comprising a quarter-wave plate, wherein the display panel is a self-luminous display panel, the display panel is disposed on the first side, and the quarter-wave plate is disposed between the self-luminous display panel and the viewing angle control module.

12. The anti-peeping display device according to claim 11, wherein a slow axis of the quarter-wave plate is angled at 45 degrees relative to the first transmission direction.

13. The anti-peeping display device according to claim 12, wherein the slow axis of the quarter-wave plate has an azimuth angle of 0 degrees or an azimuth angle of 90 degrees.

14. The anti-peeping display device according to claim 11, wherein the first alignment direction of the first liquid crystal layer is parallel to the third alignment direction of the second liquid crystal layer, and the second alignment direction of the first liquid crystal layer is parallel to the fourth alignment direction of the second liquid crystal layer.

15. The anti-peeping display device according to claim 14, wherein the second transmission direction is parallel to the second alignment direction of the first liquid crystal layer and perpendicular to the third alignment direction of the second liquid crystal layer.

16. The anti-peeping display device according to claim 15, wherein the second transmission direction is perpendicular to the first transmission direction and the third transmission direction.

17. The anti-peeping display device according to claim 14, wherein the second transmission direction is perpendicular to the second alignment direction of the first liquid crystal layer and parallel to the third alignment direction of the second liquid crystal layer.

18. The anti-peeping display device according to claim 17, wherein the second transmission direction is perpendicular to the first transmission direction and the third transmission direction.

* * * * *